(12) United States Patent
Bledsoe et al.

(10) Patent No.: US 9,004,677 B1
(45) Date of Patent: *Apr. 14, 2015

(54) METHOD AND APPARATUS FOR TRACKING MOVEMENT OF A HANDHELD DEVICE RELATIVE TO A MEDIUM

(71) Applicant: Marvell International Ltd., Hamilton (BM)

(72) Inventors: James D. Bledsoe, Corvallis, OR (US); James Mealy, Corvallis, OR (US); Asher Simmons, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 63 days.

This patent is subject to a terminal disclaimer.

(21) Appl. No.: 13/728,840

(22) Filed: Dec. 27, 2012

Related U.S. Application Data

(63) Continuation of application No. 12/013,313, filed on Jan. 11, 2008, now Pat. No. 8,342,627.

(60) Provisional application No. 60/884,522, filed on Jan. 11, 2007.

(51) Int. Cl.
*B41J 3/36* (2006.01)
*G06F 3/12* (2006.01)
*G06F 3/03* (2006.01)

(52) U.S. Cl.
CPC ............. *G06F 3/1201* (2013.01); *G06F 3/03* (2013.01)

(58) Field of Classification Search
CPC .. H04N 1/107; H04N 1/00795; G06F 3/0317; G06F 3/0304
USPC ................. 358/473; 701/500; 347/14, 108
See application file for complete search history.

(56) References Cited

U.S. PATENT DOCUMENTS

| | | | |
|---|---|---|---|
| 5,278,582 A | 1/1994 | Hongo | |
| 5,387,976 A | 2/1995 | Lesniak | |
| 5,461,680 A | 10/1995 | Davis | |
| 5,578,813 A | 11/1996 | Allen et al. | |
| 5,927,872 A | 7/1999 | Yamada | |
| 5,930,466 A | 7/1999 | Rademacher | |
| 6,348,978 B1 | 2/2002 | Blumer et al. | |
| 6,384,921 B1 | 5/2002 | Saijo et al. | |

(Continued)

FOREIGN PATENT DOCUMENTS

| | | |
|---|---|---|
| AU | 2006252324 B1 | 1/2007 |
| EP | 0655706 A1 | 5/1995 |

(Continued)

OTHER PUBLICATIONS

U.S. Appl. No. 11/955,209, filed Dec. 12, 2007, Bledsoe, et al "Printing on Planar or Non-Planar Print Survace with Handhel Printing Device", 51 pages.

(Continued)

*Primary Examiner* — Julian Huffman
*Assistant Examiner* — Alexander C Witkowski

(57) ABSTRACT

Systems, apparatuses, and methods for an adaptive filter scheme in handheld positioning device are described herein. The adaptive filter scheme may determine a direction that the positioning device is traveling and adjust one or more parameters of the filter scheme based at least in part on the determined direction. Other embodiments may be described and claimed.

16 Claims, 8 Drawing Sheets

(56) References Cited

U.S. PATENT DOCUMENTS

| | | | |
|---|---|---|---|
| 7,038,712 | B1 | 5/2006 | Livingston et al. |
| 7,200,560 | B2 | 4/2007 | Philbert |
| 7,410,100 | B2 | 8/2008 | Muramatsu |
| 7,929,019 | B2 | 4/2011 | Ohmura et al. |
| 7,949,370 | B1 | 5/2011 | Bledsoe et al. |
| 7,988,251 | B2 | 8/2011 | Dimitrijevic et al. |
| 8,342,627 | B1* | 1/2013 | Bledsoe et al. ............. 347/14 |
| 2002/0154186 | A1 | 10/2002 | Matsumoto |
| 2002/0158955 | A1 | 10/2002 | Hess et al. |
| 2003/0150917 | A1 | 8/2003 | Tsikos et al. |
| 2004/0021912 | A1* | 2/2004 | Tecu et al. ............... 358/473 |
| 2004/0109034 | A1 | 6/2004 | Brouhon |
| 2005/0001867 | A1 | 1/2005 | Akase |
| 2006/0012660 | A1 | 1/2006 | Dagborn |
| 2006/0061647 | A1 | 3/2006 | Breton |
| 2007/0150194 | A1* | 6/2007 | Chirikov ................ 701/220 |
| 2008/0007762 | A1 | 1/2008 | Robertson et al. |
| 2008/0144053 | A1 | 6/2008 | Gudan et al. |
| 2009/0034018 | A1 | 2/2009 | Lapstun et al. |
| 2009/0279148 | A1 | 11/2009 | Lapstun et al. |
| 2010/0039669 | A1 | 2/2010 | Chang et al. |
| 2010/0231633 | A1 | 9/2010 | Lapstun et al. |

FOREIGN PATENT DOCUMENTS

| | | |
|---|---|---|
| EP | 1209574 A2 | 5/2002 |
| WO | W003/076196 A1 | 9/2003 |

OTHER PUBLICATIONS

U.S. Appl. No. 11/955,228, filed Dec. 12, 2007, Bledsoe et al., "Scanner for a Mobile Device", 34 pages.

U.S. Appl. No. 11/955,240, filed Dec. 12, 2007, Bledsoe et al., "Image Translation Device for a Mobile Device," 42 pages.

U.S. Appl. No. 11/955,258, filed Dec. 12,02007, Simmons, et al., "Printer for a Mobile Device," 37 pages.

U.S. Appl. No. 11/959,027, filed Dec. 18, 2007, Simmons et al., "Ergonomic Design for a Handheld Image Translation Device," 25 pages.

U.S. Appl. No. 11/968,528, filed Jan. 2, 2008, Simmons et al., "Determining End of Print Job in Handheld Image Translation Device," 45 pages.

U.S. Appl. No. 11/972,462, filed Jan. 10, 2008, Simmons et al., "Usage Maps in Image Deposition Devices," 39 pages.

U.S. Appl. No. 12/016,833, filed Jan. 18, 2008, Simmons et al., "Sensor Positioning in Handheld Image Translation Device," 39 pages.

U.S. Appl. No. 12/036,996, filed Feb. 25, 2008, Bledsoe et al., "Determining Positioning of a Handheld Image Translation Device," 41 pages.

U.S. Appl. No. 12/037,029, filed Feb. 25, 2008, Bledsoe et al., "Definition of Print Image for Image Translation Device," 36 pages.

U.S. Appl. No. 12/037,043, filed Feb. 25, 2008, Bledsoe et al., "Bit Selection from Print in Image Transalation Device," 43 pages.

U.S. Appl. No. 12/038,660, filed Feb. 27, 2008, McKinley et al., "Providing User Feedback in Handheld Device," 40 pages.

U.S. Appl. No. 12/041,496, filed Mar. 3, 208, Mealy, "Handheld Image Translation Device," 40 pages.

U.S. Appl. No. 12/041,515, filed Mar. 3, 2008, Mealy et al., "Position Correction in Handheld Translation Device," 42 pages.

U.S. Appl. No. 12/041,535, filed Mar. 3, 2008, Mealy et al., "Dynamic Image Dithering," 34 pages.

U.S. Appl. No. 12/062,472, filed Apr. 3, 2008, McKinley et al., "Image Translation Device Providing Navigational Data Feedback to communication Device," 39 pages.

U.S. Appl. No. 12/188,056, filed Aug. 7, 2008, Mealy et al., "Controlling a Plurality of Nozzles of a Handheld Printer", 47 pages.

Fairchild, "IEEE 1284 Interface Design Solutions", Jul. 1999, Fairchild Semiconductor, AN-5010, 10 pages.

Texas Instruments, "Program and Data Memory Controller", Sep. 2004, SPRU577A, 115 pages.

* cited by examiner

METHOD AND APPARATUS FOR TRACKING MOVEMENT OF A HANDHELD DEVICE RELATIVE TO A MEDIUM

CROSS-REFERENCES TO RELATED APPLICATIONS

The present disclosure is a continuation of and claims priority to U.S. patent application Ser. No. 12/013,313, filed Jan. 11, 2008, now U.S. Pat. No. 8,342,627, issued Jan. 1, 2013, which claims priority to U.S. Patent Application No. 60/884,522, filed on Jan. 11, 2007, which are incorporated herein by reference.

TECHNICAL FIELD

Embodiments of the present invention relate to the field of handheld positioning devices and, in particular, to an adaptive filtering scheme within said handheld positioning devices.

BACKGROUND

Handheld positioning devices are used in a variety of applications. These devices are traditionally used as computer input devices, e.g., a mouse. The algorithms used to determine the position of a mouse are generally suitable for their intended applications for two reasons. First, these applications generally do not require high resolution positioning. As input devices, a user may move the mouse to control an on-screen cursor. In general, only a low-resolution positioning operation is required to effectuate the control of the on-screen cursor in a manner required for most programs. The second reason that traditional positioning algorithms are generally suitable for their intended applications is related to the fact that the on-screen movement of the cursor acts as visual feedback to the user. This only requires that the positioning device detect relative movement, which may be translated into cursor movement. It does not require a determination of the absolute position of the device relative to a fixed reference location. Detecting relative movement in this sense rather than absolute positioning may avoid the accumulation of errors that may occur through a positioning algorithm. Furthermore, any positioning errors that may occur would be communicated to the user through the cursor movement so that the user may control the mouse in a manner to compensate for the errors.

SUMMARY

At least some embodiments of the present invention are based on the technical problem of providing a positioning algorithm within a handheld positioning device that may accurately determine a position of the device. More specifically, there is provided, in accordance with various embodiments of the present invention, an adaptive filtering scheme for using with handheld positioning devices.

In some embodiments, a control block of a positioning device may include a sensor controller configured to control a navigation sensor to capture a plurality of navigational images, to determine a plurality of position values of the navigation sensor based at least in part on the plurality of navigational images, and to determine a direction of movement of the navigation sensor based at least in part on the plurality of position values; and a data filter configured to adjust one or more parameters, e.g., a directional factor, of a data filtering scheme, e.g., a linear regression filter, based at least in part on the determined direction, and to filter one or more of the plurality of position values with the data filtering scheme.

In some embodiments, the filtered one or more position values comprise approximated position values.

In some embodiments, the data filter is configured to predict one or more future position values based at least in part on the filtered one or more position values.

In some embodiments, the control block may include a communication interface configured to receive an image from an image source; and a print module configured to cause a printing substance to be deposited on a medium based at least in part on the image and the filtered one or more position values. The data filter is further configured to predict one or more future position values based at least in part on the filtered one or more position values; and the print module is further configured to prefetch image data relating to the image based at least in part on the predicted one or more future position values.

An image translation device is also disclosed in accordance with various embodiments. The image translation device may include a print head having a plurality of nozzles; a navigational sensor; and a control block having a sensor controller configured to control the navigation sensor to capture a plurality of navigational images, to determine a plurality of position values of the navigation sensor based at least in part on the plurality of navigational images, and to determine a direction of movement of the navigation sensor based at least in part on the plurality of position values; and a data filter configured to adjust one or more parameters of a data filtering scheme based at least in part on the determined direction, and to filter one or more of the plurality of position values with the data filtering scheme.

In some embodiments, the data filtering scheme is a linear regression filter and the one or more parameters include a directional factor.

In some embodiments, the control block further comprises a communication interface configured to receive an image from an image source; and a print module configured to control the print head to deposit a printing substance on a medium based at least in part on the image and the filtered one or more position values.

A method of positioning an apparatus is also disclosed in accordance with various embodiments. The method may include capturing a plurality of navigational images of a surface adjacent to an apparatus; determining a plurality of position values of the apparatus relative to a reference location based at least in part on the plurality of navigational images; determining a direction of movement of the apparatus based at least in part on the plurality of position values; adjusting one or more parameters of a data filtering scheme based at least in part on the direction; and filtering one or more of the plurality of position values with the data filtering scheme.

In some embodiments, the method may also include approximating a plurality of approximate position values based at least in part on the filtered one or more position values.

In some embodiments, the data filtering scheme comprises a linear regression filter and the method includes predicting one or more future position values based at least in part on the filtered one or more position values.

In some embodiments, the method may also include receiving an image from an image source; and depositing a printing substance on the surface based at least in part on the received image and the filtered one or more position values.

In some embodiments, the method may also include calibrating a navigation sensor to determine a directional factor; and adjusting the one or more parameters based at least in part on the directional factor.

A method for calibrating a navigation sensor for use in a positioning device may also be disclosed in accordance with various embodiments. The method may include moving the navigation sensor in a plurality of directions; measuring a plurality of position values for each of the plurality of directions in which the navigation sensor moves; comparing the plurality of measured position values to a plurality of actual position values; and developing a directional factor to be used to adjust a data filtering scheme for each of the plurality of directions based at least in part on said comparing. The data filtering scheme may be a linear regression filter and the directional factor may be a directional constant.

Another positioning device is also disclosed in accordance with various embodiments. The device may include means for capturing a plurality of navigational images of a surface adjacent to the device; means for determining a plurality of position values of the device relative to a reference location based at least in part on the plurality of navigational images; means for determining a direction of movement of the apparatus based at least in part on the plurality of position values; means for adjusting one or more parameters of a data filtering scheme based at least in part on the direction; and means for filtering one or more of the plurality of position values with the data filtering scheme.

In some embodiments, the positioning device may also include means for receiving an image from an image source; and means for depositing a printing substance on the surface based at least in part on the received image and the filtered one or more position values.

Other features that are considered as characteristic for embodiments of the present invention are set forth in the appended claims.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may.

The phrase "A and/or B" means (A), (B), or (A and B). The phrase "A, B, and/or C" means (A), (B), (C), (A and B), (A and C), (B and C) or (A, B and C). The phrase "(A) B" means (A B) or (B), that is, A is optional.

Figure 1:
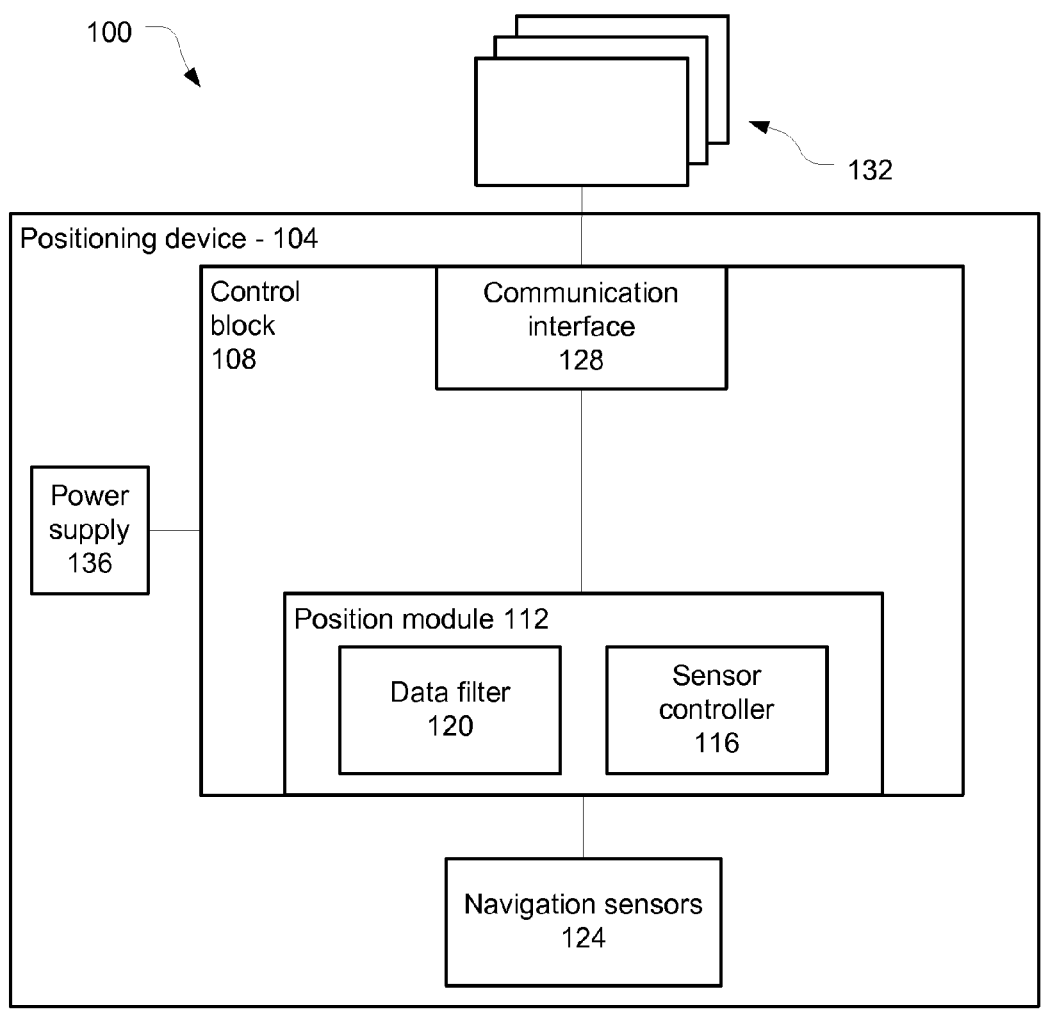
FIG. 1 is a schematic of a system including a handheld positioning device in accordance with various embodiments of the present invention.

FIG. 1 is a schematic of a system 100 including a handheld positioning device 104 (hereinafter positioning device 104) in accordance with various embodiments of the present invention. The positioning device 104 may include a control block 108 with components designed to facilitate precise and accurate positioning of the positioning device 104. The control block 108 may include a position module 112 having a sensor controller 116 and a data filter 120. The positioning device 104 may be used in a wide variety of applications in which positioning information having a high-degree of resolution with limited position-processing delays is desired.

The position module 112 may utilize the sensor controller 116 to control one or more navigation sensors 124. The navigation sensors 124 may include a light source, e.g., light-emitting diode (LED), a laser, etc., and an optoelectronic sensor designed to capture a series of navigational images of a surface adjacent to the positioning device 104 as it is moved over the surface.

The navigational images may be analyzed to detect structural variations of the surface. The movement of the structural variations in successive images may indicate motion of the positioning device 104 relative to the surface. Accumulating this relative movement may allow for the position of the navigation sensors 124 to be established as a plurality of position values relative to a reference location, e.g., the location of the navigation sensors 124 at an initiation of a positioning operation.

One or more of these position values may be filtered through a data filtering scheme by the data filter 120 to establish a series of approximated position values. The approximated position values may be used to predict future position values and/or to provide error correction to the measured values. In some embodiments, as will be explained in further detail herein, the direction that the positioning device 104 is moving may have a bearing on the data filtering scheme employed by the data filter 120.

The control block 108 may include a communication interface 128 configured to communicatively couple the control block 108 to other devices 132. The communication interface 128 may include a wireless transceiver to allow the communicative coupling with the other devices 132 to take place over a wireless link. Data may be wirelessly transmitted over the link through the modulation of electromagnetic waves with frequencies in the radio, infrared, or microwave spectrums.

A wireless link may contribute to the mobility and versatility of the positioning device 104. However, some embodiments may additionally/alternatively include a wired link communicatively coupling one or more of the other devices 132 to the communication interface 128.

In some embodiments, the communication interface 128 may communicate with the other devices 132 through one or more wired and/or wireless networks including, but not limited to, personal area networks, local area networks, wide area networks, metropolitan area networks, etc. The data transmission may be done in a manner compatible with any of a number of standards and/or specifications including, but not limited to, 802.11, 802.16, Bluetooth, Global System for Mobile Communications (GSM), code-division multiple access (CDMA), Ethernet, etc.

In some embodiments, the positioning information from the position module 112 may be communicated over the link to the other devices 132. The other devices 132, which may include a computing device such as, but not limited to, a desktop computing device, a laptop computing device, a mobile computing device, a personal digital assistant, a cellular phone, etc., may include a host device operating a program utilizing the positioning information. Thus, the positioning device 104, in accordance with some embodiments, may be utilized as a peripheral input device for one or more of the other devices 132. Utilizing the positioning device 104 as an input device for a host device may be desirable when an operating program requires high-resolution positioning information from the input device. This may be the case in, e.g., gaming applications, medical applications, etc.

In some embodiments, the positioning information from the position module 112 may be used locally. For example, the positioning device 104 may be utilized as a printing and/or scanning device as is shown in FIG. 2.

The positioning device 104 may also include a power supply 136 coupled to the control block 108. The power supply 136 may be a mobile power supply, e.g., a battery, a rechargeable battery, a solar power source, etc. In other embodiments the power supply 136 may additionally/alternatively regulate power provided by another component (e.g., one of the other devices 132, a power cord coupled to an alternating current (AC) outlet, etc.).

Figure 2:
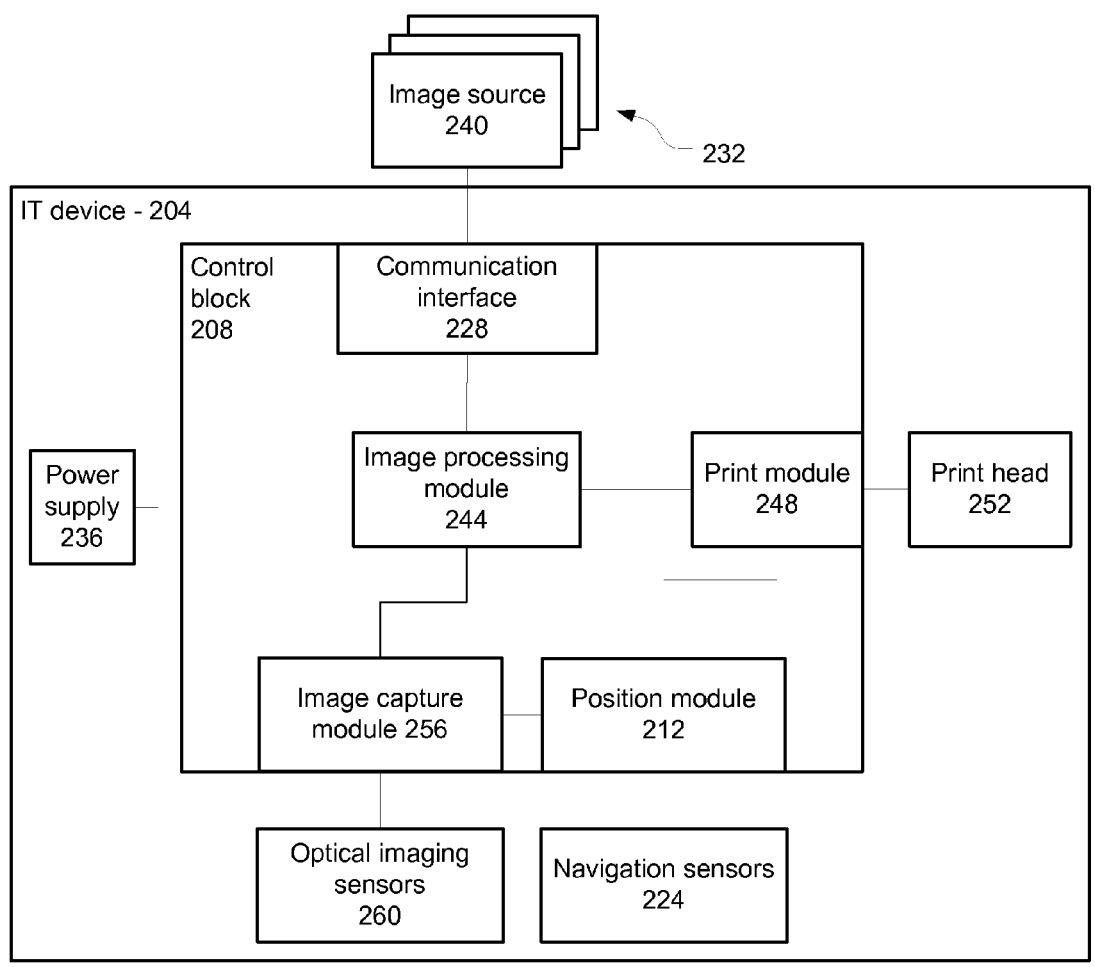
FIG. 2 is a schematic of a system including a handheld image translation device in accordance with various embodiments of the present invention.

FIG. 2 illustrates a positioning device used as an image translation (IT) device 204 in accordance with various embodiments of the present invention. The IT device 204 may have a control block 208, a position module 212, navigation sensors 224, a communication interface 228, and a power supply 236 similar to like-name components discussed with reference to FIG. 1. The IT device 204 may also include other components configured to provide image translation functionality. The IT device 204 may use positioning information provided by the position module 212 for reliable image translation in a mobile and versatile platform as will be explained herein.

Image translation, as used herein, may refer to a translation of an image that exists in a particular context (e.g., medium) into an image in another context. For example, an image translation operation may be a scan operation. In this situation, a target image, e.g., an image that exists on a tangible medium, is scanned by the IT device 204 and an acquired image that corresponds to the target image is created and stored in memory of the IT device 204. For another example, an image translation operation may be a print operation. In this situation, an acquired image, e.g., an image as it exists in memory of the IT device 204, may be printed onto a medium.

In this embodiment, other devices 232 may include an image source 240 configured to provide an image to the IT device 204. The image source 240 may include a general-purpose computing device or it may be a removable storage device, e.g., a flash memory data storage device, designed to store data such as image data. If the image source 240 is a removable storage device, e.g., a universal serial bus (USB) storage device, the communication interface 228 may include a port, e.g., USB port, designed to receive the storage device.

The communication interface 228 may transmit the received image data to an on-board image processing module 244. The image processing module 244 may process the received image data in a manner to facilitate an upcoming printing process. Image processing techniques employed by the image processing module 244 may include dithering, decompression, half-toning, color plane separation, and/or image storage. In various embodiments some or all of these image processing operations may be performed by the image source 240 or another device. The processed image may then be transmitted to a print module 248 where it is cached in anticipation of a print operation.

The position module 212 may generate positioning information indicative of a position of a print head 252, which may be arranged at a fixed distance from the navigation sensors 224. The position module 212 may provide this positioning information to the print module 248, which may coordinate the location of the print head 252 to a portion of the processed image with a corresponding location. The print module 248 may then control the print head 252 in a manner to deposit a printing substance onto medium to represent the corresponding portion of the processed image.

The print head 252 may be an inkjet print head having a plurality of nozzles designed to emit liquid ink droplets. The ink, which may be contained in reservoirs or cartridges, may be black and/or any of a number of various colors. A common, full-color inkjet print head may have nozzles for cyan, magenta, yellow, and black ink. Other embodiments may utilize other printing techniques, e.g., toner-based printers such as laser or LED printers, solid ink printers, dye-sublimation printers, inkless printers, etc.

The control block 208 may also include an image capture module 256. The image capture module 256 may be communicatively coupled to one or more optical imaging sensors 260. The optical imaging sensors 260 may include a number of individual sensor elements. The optical imaging sensors 260 may be designed to capture a plurality of surface images of the medium, which may be individually referred to as component surface images. The image capture module 256 may generate a composite image by stitching together the component surface images. The image capture module 256 may receive positioning information from the position module 212 to facilitate the arrangement of the component surface images into the composite image.

In an embodiment in which the IT device 204 is capable of scanning full color images, the optical imaging sensors 260 may have the sensor elements designed to scan different colors.

A composite image acquired by the IT device 204 may be subsequently transmitted to one or more of the other devices 232 by, e.g., e-mail, fax, file transfer protocols, etc. The composite image may be additionally/alternatively stored locally by the IT device 204 for subsequent review, transmittal, printing, etc.

In addition (or as an alternative) to composite image acquisition, the image capture module 256 may contribute to the operations of the position module 212. In various embodiments, the component surface images (whether individually, some group, or collectively as the composite image) may be compared to the processed print image rendered by the image processing module 244 to correct for accumulated positioning errors and/or to reorient the position module 212 in the event the position module 212 loses track of its reference location. This may occur, for example, if the IT device 204 is removed from the medium during a print operation.

Figure 3:
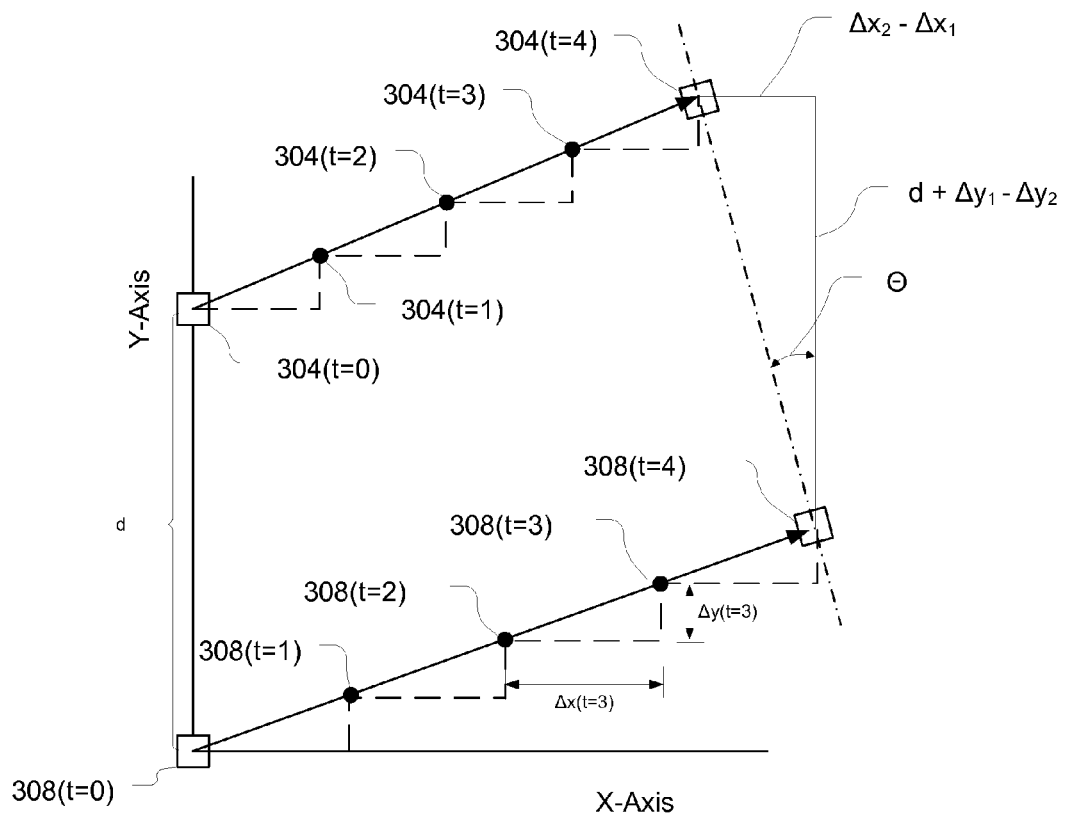
FIG. 3 is a graphic depiction of a positioning operation of a handheld positioning device in accordance with various embodiments of the present invention.

FIG. 3 is a graphic depiction of a positioning operation of a positioning device in accordance with embodiments of the present invention. At initiation, e.g., t=0, two navigation sensors 304 and 308 of a positioning device may be in an initial position indicated by 304(t=0) and 208(t=0), respectively. Over successive time intervals, e.g., t=1-4, the navigation sensors 304 and 308 may be moved to an end position indicated by 304(t=4) and 308(t=4), respectively. As used in description of this embodiment, the "initial position" and the "end position" are used merely with reference to this particular operation and not necessarily the start or end of the positioning operation in general or any related operations, e.g., printing or scanning operations.

As the sensors 304 and 308 are moved they may capture navigational images at each of the indicated time intervals, e.g., t=0-4. The capture period may be synchronized between the sensors 304 and 308 by, e.g., hardwiring together the capture signals transmitted from a sensor controller. The capture periods may vary and may be determined based on set time periods, detected motion, or some other trigger. In some embodiments, each of the sensors 304 and 308 may have different capture periods that may or may not be based on different triggers.

The captured navigational images may be used by a position module to determine a translation of a positioning device relative to a reference location, e.g., the sensors 304(t=0) and 308(t=0) as well as a rotation of the positioning device. In some embodiments, the translation of the positioning device may be determined by analyzing navigational images from a first sensor, e.g., sensor 304, while the rotation of the positioning device may be determined by analyzing navigational images from a second sensor, e.g., sensor 308. In particular, and in accordance with some embodiments, the rotation of a positioning device may be determined by comparing translation information derived from the navigational images provided by sensor 308 to translation information derived from navigational images provided by sensor 304. Determining both the translation and the rotation of the positioning device may allow for accurate positioning of, e.g., nozzles of a print head, sensor elements of optical imaging sensors, etc.

The translation of the sensors 304 and 308 may be determined within the context of a coordinate system, e.g., a Cartesian coordinate system. In particular, the translation values may be determined for two-dimensions of the coordinate system, e.g., the x-axis and the y-axis as shown in FIG. 3. For example, the position module may accumulate the incremental $\Delta x$'s and $\Delta y$'s between successive time periods in order to determine the total translation of the sensors 304 and 308 from time zero to time four. The accumulated changes for sensor 304 may be referred to as $\Delta x_1$ and $\Delta y_1$ and the accumulated changes for sensor 308 may be referred to as $\Delta x_2$ and $\Delta y_2$. The sensors 304 and 308 may be a distance d from one another. The rotation $\Theta$ of a positioning device may then be determined by the following equation:

$$\theta = \tan^{-1}\left(\frac{|\Delta x_2 - \Delta x_1|}{|d + \Delta y_1 - \Delta y_2|}\right),\quad \text{Eq. 1.}$$

In designing the positioning device, the distance d may be established based at least in part on the desired resolution of the data output from the sensors 304 and 308. For example, if the sensors 304 and 308 have a resolution of approximately 1600 counts per inch, the distance d may be approximately two inches.

As can be seen, determining the position of the positioning device relies upon the accumulated $\Delta x$ and $\Delta y$ values. As positioning errors in these measurements accumulate, the total translation of the positioning device may become skewed. This may be of particular concern to the determination of the rotation of the positioning device as it is based on accumulated delta values from both sensors 304 and 308.

Figure 4:
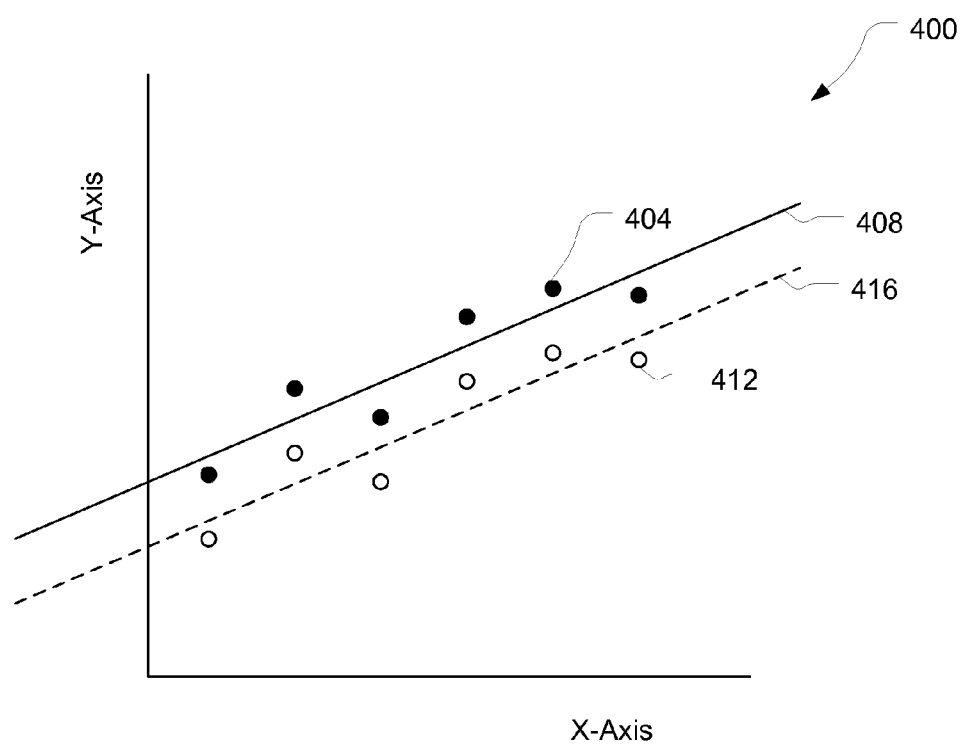
FIG. 4 is a chart illustrating position data and filtering in accordance with various embodiments in the present invention.

FIG. 4 is a chart 400 illustrating position data and filtering in accordance with various embodiments in the present invention. Measured translation values 404 (indicated by the solid dots) may represent the raw, unfiltered values measured by a navigation sensor. These measured translation values 404 (or measured values 404) may be provided to a data filter from a sensor controller.

A simple linear regression analysis may attempt to determine a relationship between two random variables, x and y, by providing a line to fit the data. The linear regression filter may be represented by the following equation:

$$Y = a + bX + e;\quad \text{Eq. 2,}$$

where a and b may be coefficients determined by a condition that the sum of the square of the residual error e is as small as possible. Line 408 may result from the measured values 404 being filtered through a typical linear regression filter.

Direction of motion of the positioning device may consistently influence errors of the measured values. For example, in one embodiment, it may be determined that when the positioning device is moving in an upward diagonal direction the navigation sensors will consistently measure values that are greater than the actual values. This may be shown in FIG. 4 by the measured values 404 being consistently greater than actual values 412 (indicated by circles).

Accordingly, embodiments of the present invention may modify parameters of a data filtering scheme, e.g., linear regression filter, to account for this influence. In one embodiment, the standard linear regression filter may be modified by a directional constant c as shown in the following equation:

$$Y = a + bX + e + c;\quad \text{Eq. 3.}$$

In the embodiment of FIG. 4, the directional constant c may be a negative value to provide line 416 that has a lower y-intercept than line 408. While it may be that the line 416 trends below the measured values 404 it may correspond more closely to the actual values 412 as a result of the modified parameter. The line 416 may be considered as representing filtered position values that serve to approximate the actual values 412.

Figure 5:
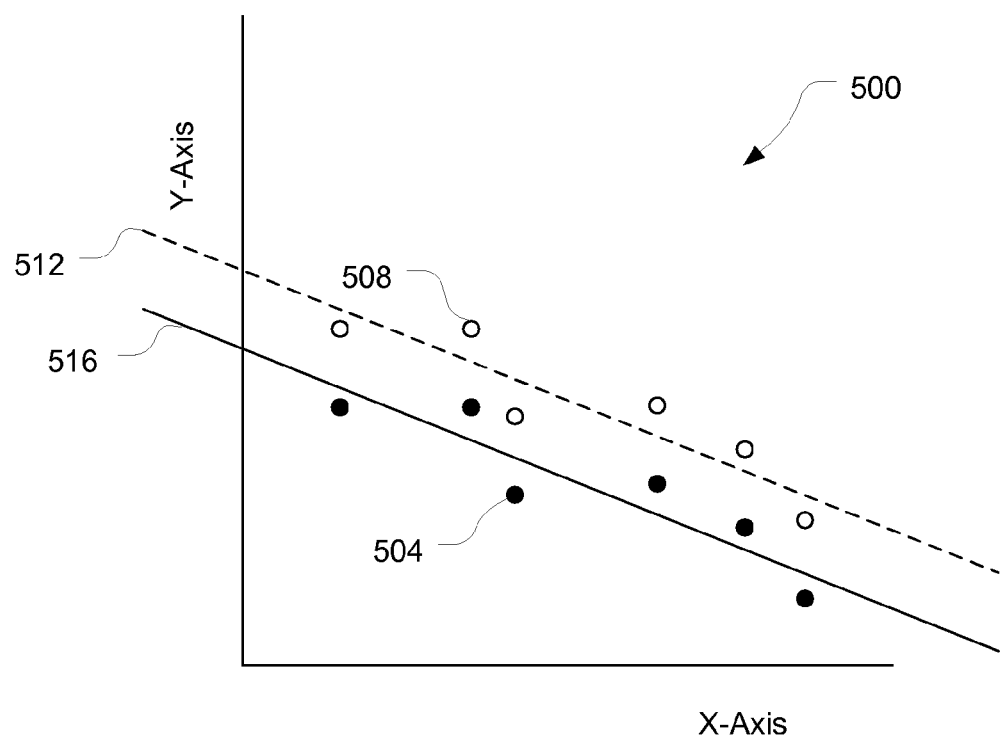
FIG. 5 is a chart illustrating other position data and filtering in accordance with various embodiments in the present invention.

FIG. 5 is another chart 500 illustrating position data and filtering in accordance with various embodiments of the present invention. Measured values 504 of this embodiment may tend to be below actual values 508. Accordingly, the directional constant c may be a positive value so that a y-intercept of a corrected line 512 is higher than a y-intercept of line 516 corresponding to the measured values 504.

The influence that the direction of travel may have on the measured values may be a function of the navigation sensors themselves. For example, the navigation sensors may truncate position values resulting in the actual values to be consistent less or greater than the measured values depending on movement. The directional constants may be determined for each navigation sensor at a calibration of the sensor.

Calibration of a navigation sensor may occur by moving the sensor in a variety of directions. The position values measured for each direction may be compared to known position values. Based on this comparison, a directional factor, e.g., a directional constant, may be determined for each of the different directions of movement.

While the above discusses modifying the linear regression filter scheme through the addition of a directional constant, other embodiments may modify other directional factors. For example, some embodiments may include a directional slope modifier that may affect the slope of a corrected line. Furthermore, while the above discusses the use of a linear regression filter as the data filtering scheme, other schemes may be additionally/alternatively used. In various embodiments, the data filtering scheme may include, but is not limited to, a Kalman filter, a quadratic regression filter, a cubic regression filter, etc.

The filtered values resulting from a data filter analysis may be used in a variety of ways. In some embodiments the filtered values may be used in calculation of the rotation of the positioning device. This may prevent, or mitigate, translation error from accumulating, which may have a disproportionate affect on a subsequent rotation calculation. The filtered values may additionally/alternatively provide a basis for predicting values by extrapolation of the corrected line.

Predicting future position values as described may help to reduce latency resulting from processing the position values. This may be beneficial, e.g., in an embodiment such as that shown and described in FIG. 2.

The position module 212 may make a determination of the position of the navigation sensors 224 prior to the print module 248 controlling the print head 252 to deposit a printing substance. In order for the positioning information to remain relevant to the print determination, it may be desirable that the determination of the positioning information may take place as soon as possible after the acquisition of the navigational images upon which it is based. Accordingly, predicting future position values may, e.g., allow the print module 248 to prefetch the image data that is to be printed.

In some embodiments, if it is determined that the predicted position values are inaccurate prior to printing, the printing operation may not be performed for that particular location and the prefetched image data may be discarded. If there is sufficient time to fetch the correct image data before the IT device 204 moves past the location, it may do so. Otherwise, the print operation for that particular location may be skipped.

Figure 6A:
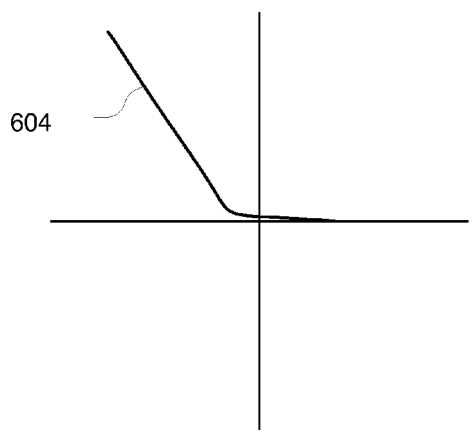
FIGS. 6a and 6b are charts illustrating overshoot in accordance with various embodiments of the present invention.
Figure 6B:
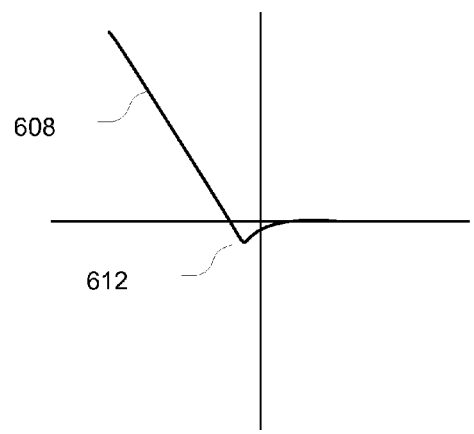

Predictions of future position values may be fairly accurate when the actual movement of the positioning device is linear over the span of the regression. If the actual movement, e.g., line 604 in FIG. 6a, includes rapid changes in velocity, direction, and/or rotation, then predicted motion, e.g., line 608 in FIG. 6b, may overshoot 612 on occasion.

The hand-generated motion of the positioning device generally will not include rapid changes of the type that may cause these overshoots. Accordingly, reasonable application by a user will most often be smooth enough to allow the data filtering to assume linear behavior over periods long enough to provide accurate filtering.

Figure 7:
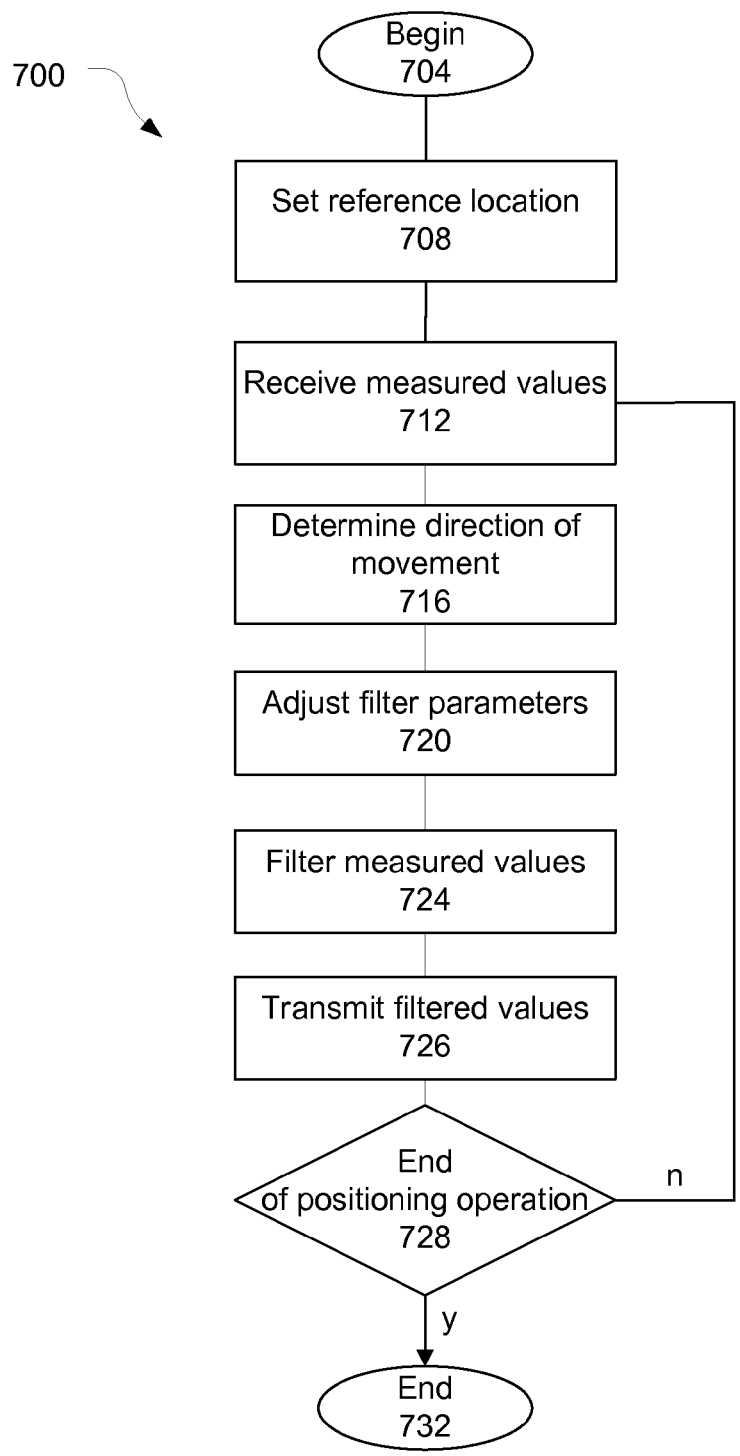
FIG. 7 is a flow diagram depicting a positioning operation in accordance with various embodiments of the present invention.

FIG. 7 is a flow diagram 700 depicting a positioning operation in accordance with various embodiments of the present invention. A positioning device may begin a positioning operation at block 704. This may occur automatically, when a user activates a control on the positioning device, when the positioning device receives a control signal from a host device, etc.

A position module within the positioning device may set a reference location at block 708. The reference location may be set when the positioning device is placed onto a surface. This may be ensured by the user being instructed to activate an initiation control after the positioning device is in place and/or by the proper placement of the positioning device being treated as a condition precedent to instituting the operation. In some embodiments the proper placement of the positioning device may be automatically detected through sensors, e.g., a navigation sensor, an optical image sensor, a proximity sensor, etc.

Once the reference location is set at block 708, the sensor controller may receive measured translational values from the navigation sensors at block 712. The sensor controller may determine a direction of movement for the navigation sensors at block 716. A data filter of the position module may adjust filter parameters based at least in part on the determined direction at block 720, filter one or more of the measured values at block 724, and transmit the filtered values to an image capture module and/or print module at block 726.

The position module may then determine whether the positioning operation is complete at block 728. If it is determined that the positioning operation is not yet complete, the operation may loop back to block 712 to receive the next set of measured values. If it is determined that it is the end of the positioning operation, the operation may end in block 732. In some embodiments, the end of the positioning operation may be tied to the end of a corresponding image translation operation.

Figure 8:
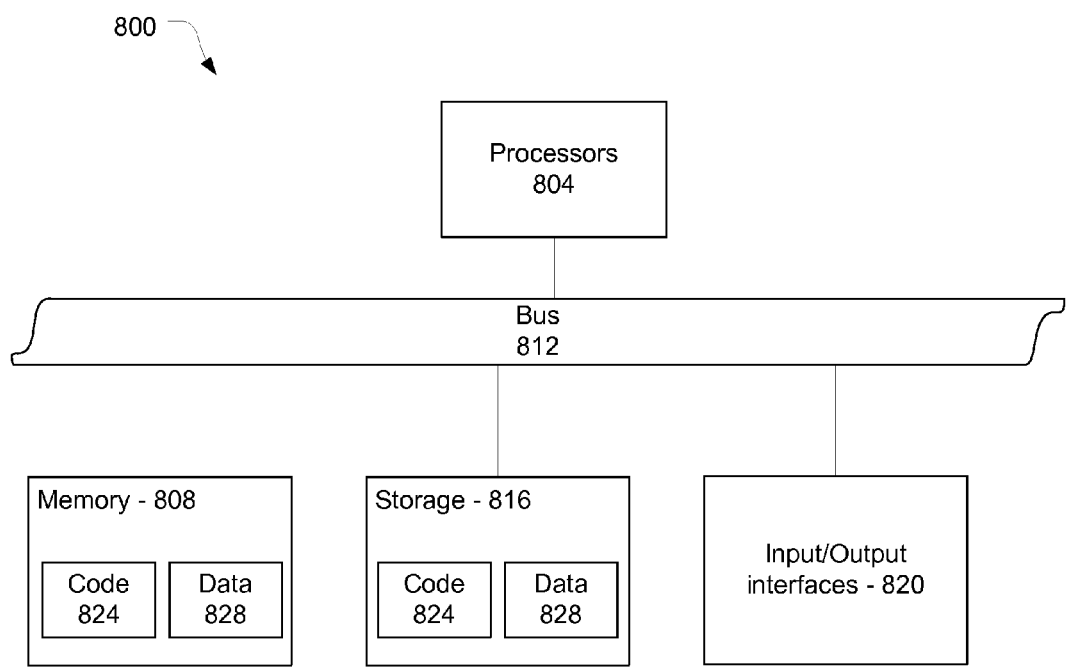
FIG. 8 is a computing device capable of implementing a control block in accordance with various embodiments of the present invention.

FIG. 8 illustrates a computing device 800 capable of implementing a control block, e.g., control block 108, in accordance with various embodiments. As illustrated, for the embodiments, computing device 800 includes one or more processors 804, memory 808, and bus 812, coupled to each other as shown. Additionally, computing device 800 includes storage 816, and one or more input/output interfaces 820 coupled to each other, and the earlier described elements as shown. The components of the computing device 800 may be designed to provide the positioning and/or filtering functions of a control block of a positioning device as described herein.

Memory 808 and storage 816 may include, in particular, temporal and persistent copies of code 824 and data 828, respectively. The code 824 may include instructions that when accessed by the processors 804 result in the computing device 800 performing operations as described in conjunction with various modules of the control block in accordance with embodiments of this invention. The processing data 828 may include data to be acted upon by the instructions of the code 824. In particular, the accessing of the code 824 and data 828 by the processors 804 may facilitate the positioning and/or filtering operations as described herein.

The processors 804 may include one or more single-core processors, multiple-core processors, controllers, application-specific integrated circuits (ASICs), etc.

The memory 808 may include random access memory (RAM), dynamic RAM (DRAM), static RAM (SRAM), synchronous DRAM (SDRAM), dual-data rate RAM (DDRRAM), etc.

The storage 816 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. Storage 816 may be a storage resource physically part of the computing device 800 or it may be accessible by, but not necessarily a part of, the computing device 800. For example, the storage 816 may be accessed by the computing device 800 over a network.

The I/O interfaces 820 may include interfaces designed to communicate with peripheral hardware, e.g., print head 252, navigation sensors 224, etc., and/or remote devices, e.g., other devices 232.

In various embodiments, computing device 800 may have more or less elements and/or different architectures.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This application is intended to cover any adaptations or variations of the embodiment discussed herein. Therefore, it is manifested and intended that the invention be limited only by the claims and the equivalents thereof.

What is claimed is:

1. An apparatus comprising:
a controller configured to
control a sensor to capture a plurality of images of a medium adjacent to the sensor, wherein the capture of the plurality of images occurs relative to a reference location located on the medium,
determine a plurality of values based at least in part on the plurality of images, wherein the plurality of values correspond to movement of the sensor relative to the reference location located on the medium, and
determine, based at least in part on the plurality of values, a direction of the movement of the sensor relative to the reference location located on the medium; and
a filter configured to
based at least in part on the determined direction of the movement of the sensor relative to the reference location located on the medium, adjust a parameter of a data filtering scheme, and
filter the plurality of values in accordance with the adjusted parameter of the data filtering scheme, wherein the filtered plurality of values are useable by the controller to track the movement of the sensor relative to the reference location located on the medium.

2. The apparatus of claim 1, wherein the filtered plurality of values comprise approximated values.

3. The apparatus of claim 1, wherein the controller is configured to, based at least in part on the plurality of filtered values, predict a future position of the sensor relative to the reference location located on the medium.

4. The apparatus of claim 1, wherein the data filtering scheme is a linear regression filter.

5. The apparatus of claim 1, wherein the parameter includes a directional factor.

6. The apparatus of claim 1, further comprising:
an interface configured to receive an image from a source; and
a print module configured to cause a printing substance to be deposited on the medium based at least in part on (i) the image and (ii) the filtered plurality of values.

7. The apparatus of claim 6, wherein:
the controller is further configured to, based at least in part on the plurality of filtered values, predict a future position of the sensor relative to the reference location located on the medium; and
the print module is further configured to prefetch image data relating to the image based at least in part on the predicted future position of the sensor.

8. An apparatus comprising:
a print head having a plurality of nozzles;
a sensor;
a control block having a controller configured to
control the sensor to capture a plurality of images of a medium adjacent to the sensor, wherein the capture of the plurality of images occurs relative to a reference location located on the medium,
determine a plurality of values based at least in part on the plurality of images, wherein the plurality of values correspond to movement of the sensor relative to the reference location located on the medium, and
determine, based at least in part on the plurality of values, a direction of the movement of the sensor relative to the reference location located on the medium; and
a filter configured to
based at least in part on the determined direction of the movement of the sensor relative to the reference location located on the medium, adjust a parameter of a data filtering scheme, and
filter the plurality of values in accordance with the adjusted parameter of the data filtering scheme, wherein the filtered plurality of values are useable by the control block to track the movement of the sensor relative to the reference location located on the medium.

9. The apparatus of claim 8, wherein the data filtering scheme is a linear regression filter and the parameter includes a directional factor.

10. The apparatus of claim 8, wherein the control block further comprises:
an interface configured to receive an image from a source; and
a print module configured to control the print head to deposit a printing substance on the medium based at least in part on (i) the image and (ii) the filtered plurality of values.

11. A method comprising:
capturing a plurality of images of a medium adjacent to an apparatus;
based at least in part on the plurality of images, determining a plurality of values, wherein the plurality of values correspond to movement of the apparatus relative to a reference location located on the medium;
based at least in part on the plurality of values, determining a direction of movement of the apparatus relative to the reference location located on the medium;
based at least in part on the determined direction of the movement of the apparatus relative to the reference location located on the medium, adjusting a parameter of a data filtering scheme; and
filtering the plurality of values in accordance with the adjusted parameter of the data filtering scheme, wherein the filtered plurality of values are useable to track the movement of the apparatus relative to the reference location located on the medium.

12. The method of claim 11, further comprising:
based at least in part on the filtered plurality of values, approximating a plurality of approximate values.

13. The method of claim 11, further comprising:
based at least in part on the filtered plurality of values, predicting a future value.

14. The method of claim 11, wherein the data filtering scheme comprises a linear regression filter.

15. The method of claim 11, further comprising:
receiving an image from a source; and
based at least in part on (i) the received image and (ii) the filtered plurality of values, depositing a printing substance on the medium.

16. The method of claim 11, further comprising:
calibrating a sensor of the apparatus to determine a directional factor; and
based at least in part on the directional factor, adjusting the parameter of the data filtering scheme.

* * * * *